United States Patent
Hourihan

(12) 
(10) Patent No.: US 6,435,137 B1
(45) Date of Patent: Aug. 20, 2002

(54) PET RESTRAINT DEVICE AND METHOD OF MAKING THEREOF

(76) Inventor: Anthony C. Hourihan, P.O. Box 319, Clover, SC (US) 29710

( * ) Notice: Subject to any disclaimer, the term of this patent is extended or adjusted under 35 U.S.C. 154(b) by 0 days.

(21) Appl. No.: 09/768,157

(22) Filed: Jan. 24, 2001

(51) Int. Cl.[7] .................................................. A01K 3/00
(52) U.S. Cl. ........................ 119/788; 119/786; 119/791
(58) Field of Search ................................. 119/788, 780, 119/769, 786, 787, 791, 779

(56) References Cited

U.S. PATENT DOCUMENTS

| | | | |
|---|---|---|---|
| 249,904 A | | 11/1881 | Covert |
| 427,012 A | * | 4/1890 | Reed ........................... 119/788 |
| 704,730 A | * | 7/1902 | Zierleyn ...................... 114/294 |
| 753,835 A | * | 3/1904 | Albee .......................... 119/769 |
| 762,430 A | | 6/1904 | Reddish |
| 843,543 A | * | 2/1907 | Matsumoto .................. 114/294 |
| 876,328 A | | 1/1908 | Chamberlain |
| 1,378,482 A | | 5/1921 | Morgan |
| 1,456,627 A | | 5/1923 | Delbridge |
| 2,772,660 A | * | 12/1956 | Saul ............................... 119/61 |
| 3,508,525 A | * | 4/1970 | Sawyer ........................ 119/780 |
| 3,658,037 A | * | 4/1972 | Hunter ......................... 119/786 |
| 3,921,589 A | * | 11/1975 | McGahee ..................... 119/786 |
| 4,060,244 A | * | 11/1977 | Graham ....................... 119/789 |
| 4,491,091 A | | 1/1985 | Satterfield |
| 4,932,185 A | * | 6/1990 | Lebel ............................. 52/37 |
| 4,982,701 A | | 1/1991 | Papak |
| 5,732,659 A | | 3/1998 | Wiggens |
| 5,785,007 A | * | 7/1998 | Sauber et al. ................ 119/771 |
| 5,865,416 A | * | 2/1999 | Hanaway ................... 24/16 PB |
| 6,314,916 B1 | * | 11/2001 | Watson, Sr. .................. 119/769 |

FOREIGN PATENT DOCUMENTS

| | | |
|---|---|---|
| CA | 2143573 | 8/1996 |
| GB | 453621 | 9/1936 |

\* cited by examiner

*Primary Examiner*—Yvonne R. Abbott

(57) ABSTRACT

An economical pet restraint device and method of making thereof for use in one's lawn which is readily installed and removed. A concrete block having a ringed pin with the ring disposed in a cylindrical recess defined in the top surface of the concrete block is implanted in the lawn. The pet's tether can then be attached to the ring by a spring clamp. Multiple animals can be leashed to the anchor.

4 Claims, 3 Drawing Sheets

PET RESTRAINT DEVICE AND METHOD OF MAKING THEREOF

BACKGROUND OF THE INVENTION

1. Field of The Invention

The present invention relates generally to pet restraints. More specifically, the invention is a pet restraint device and the method of making the device which is implanted outdoors in the yard for attaching the pet's leash or chain to an embedded concrete block having a pin.

2. Description of The Related Art

The related art of interest describes various pet restraints but none discloses the present invention. There is a need for an outdoor pet restraint device which is economical and durable to attach the pet's leash to it. The related art will be discussed in the order of perceived relevance to the present invention.

U.S. Pat. No. 704,730, issued on Jul. 15, 1902 to Antoni Zierleyn, describes a conical hitching-weight for carriage animals with an embedded eye bolt that has a buffer composition either around the bottom as an annulus or over the entire surface made of rubber, lead or lead alloy. The main body's metallic composition has not been disclosed. FIGS. 1 and 2 show a concave region around the eye bolt, but the eye projects above the hitching-weight. The hitching-weight is thrown on street surfaces. The hitching weight is distinguishable for requiring an annulus structure on a metal base and non-penetration of a ground surface.

U.S. Pat. No. 1,378,482, issued on May 17, 1921 to Millard F. Morgan, describes a horse-hitch for implanting in the ground. The device has a cylindrical housing having a cavity for locking in the head of the shank of a worm screw. The top of the device narrows to a neck supporting an eye for attaching a link and a rope. The device is used by inserting the spiral worm screw in the ground, the body of the device being above ground. The device is distinguishable for placement of the main body on the ground and requiring a worm screw for anchorage.

U.S. Pat. No. 249,904, issued on Nov. 22, 1881 to James C. Covert, describes a tethering device comprising a pointed metal stake having a recess on its top region for clamping on a swiveling ring. The tether has hook clamps on each end. The device is distinguishable for its metal composition, swivel construction and a pointed stake.

U.S. Pat. No. 762,439, issued on Jun. 14, 1904 to Gus Reddish, describes a hitching-weight comprising a cast iron pearshaped body having a plurality of radially and upwardly extending steel prongs ending in knobs. The attachment means can be a swiveling ring or a staple. The device is distinguishable for its metal composition, hooked structure and placement on the street.

U.S. Pat. No. 876,328, issued on Jan. 14, 1908 to John H. Chamberlin, describes a hitching-weight or anchor comprising a body having four pairs of parallel prongs curving up. The upper body is tapered and has a ring for tying an anchor rope or hitching strap. The device is distinguishable for its anchoring structure.

U.S. Pat. No. 1,456,627, issued on May 29, 1923 to Edward J. Delbridge, describes a hitching and tethering device comprising a cylindrical metal stake having an upper end milled for holding purposes, a middle portion having a rotatable collar with openings for a plurality of chains, and a pointed tip. The device is distinguishable for its stake and rotatable collar structure.

U.S. Pat. No. 4,491,091, issued on Jan. 1, 1985 to Audie L. Satterfield, describes a tangle free animal stake having a rectangular plate anchored at its corners by stakes. A standard supports a rotator structure having an apertured cover with a hook for attachment of several swivel chains. The device is distinguishable for its rotator structure.

U.S. Pat. No. 4,892,701, issued on Jan. 8, 1991 to Don J. Papak, describes an animal restraint device comprising a tubular member placed in the ground and holding a ringed stake. The device is distinguishable for its rotating structure.

U.S. Pat. No. 5,732,659, issued on Mar. 31, 1998 to James S. Wiggins, describes a pet tether anchor enabling the leashing of one or more domesticated animals to permit height adjustability, adjustable rotation or non-rotation of the leash around the stake, addition of a stringer to attach to a plurality of pet tether anchors, and providing a protective housing. The anchor device is distinguishable for its stake and housing structure.

U.K. Patent Application No. 453,621, published on Sep. 15, 1936, describes a tethering device for livestock comprising a horizontal pole rotatable on a stake having webs. The animal is tied by a rope to a chain having swivel links on both ends to the horizontal pole. The device is distinguishable for its required horizontal pole.

Canada Patent Application No. 2,143,573, published on Aug. 8, 1929, describes an animal tethering apparatus for house-training a pet comprising a plastic coated flexible steel strand cable having a large loop at one end for tying the cable to a furniture leg and a smaller loop with a swivel-hook fastener for the pet's collar. The apparatus is distinguishable for its tethering use inside a dwelling.

None of the above inventions and patents, taken either singularly or in combination, is seen to describe the instant invention as claimed. Thus, a pet restraint device solving the aforementioned problems is desired.

SUMMARY OF THE INVENTION

The present invention is directed to an economical pet restraint device and the method of making same for use in one's lawn which is readily installed and removed if necessary. A concrete block having a stainless steel ringed pin inserted in a cylindrical recess in its top face is implanted in the lawn up to the ringed pin. The pet's tether can then be attached to the ring by a spring clamp. Multiple animals can be leashed to the anchor.

Accordingly, it is a principal object of the invention to provide a pet restraint device.

It is another object of the invention to provide a pet restraint device comprising a concrete block having a ringed pin in a cylindrical recess in its top face.

It is a further object of the invention to provide a pet restraint device wherein at least one concrete block is left embedded in a lawn, but readily removed if desirable.

Still another object of the invention is to provide a pet restraint device having a spring clamp attachable to the ringed pin and to a pet's leash.

Yet still another object of the invention is to provide a method of making the pet restraint devices by utilizing paper cups.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
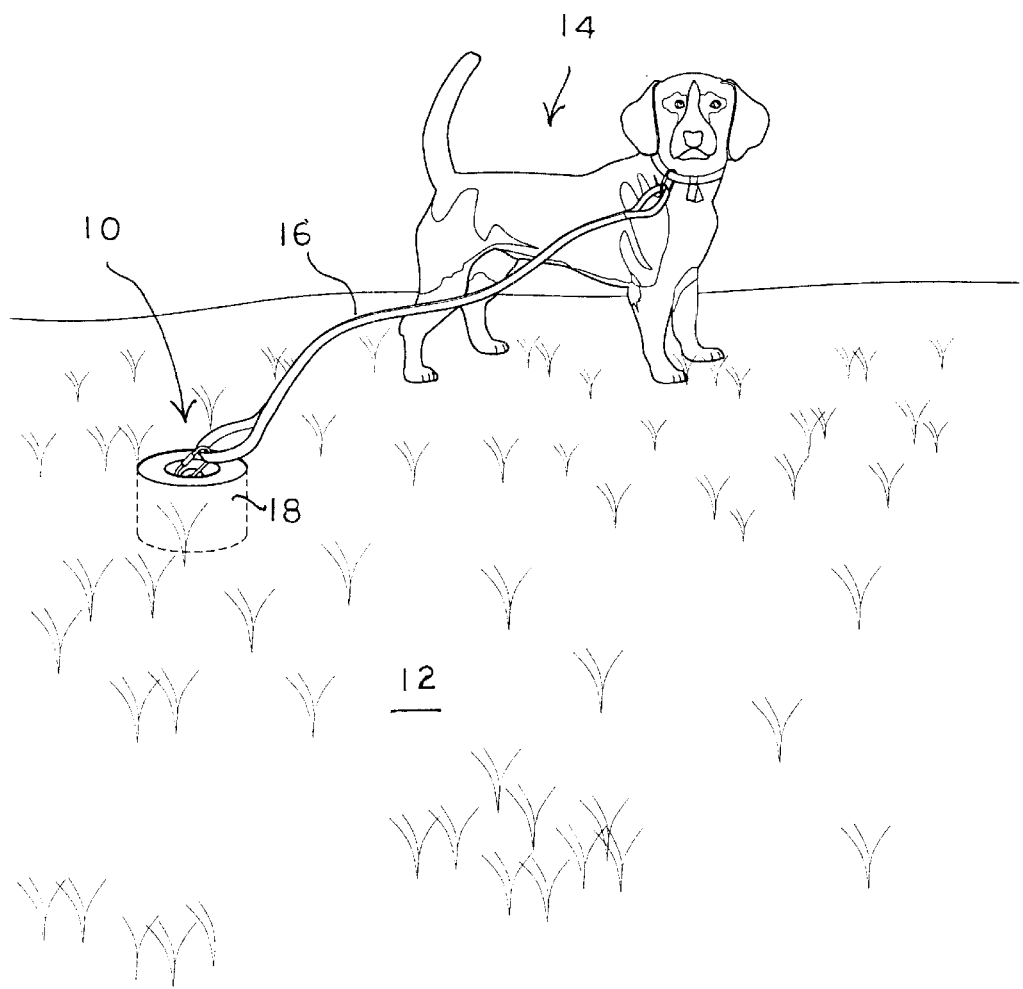
FIG. 1 is an environmental, perspective view of a pet restraint device according to the present invention.
Figure 3:
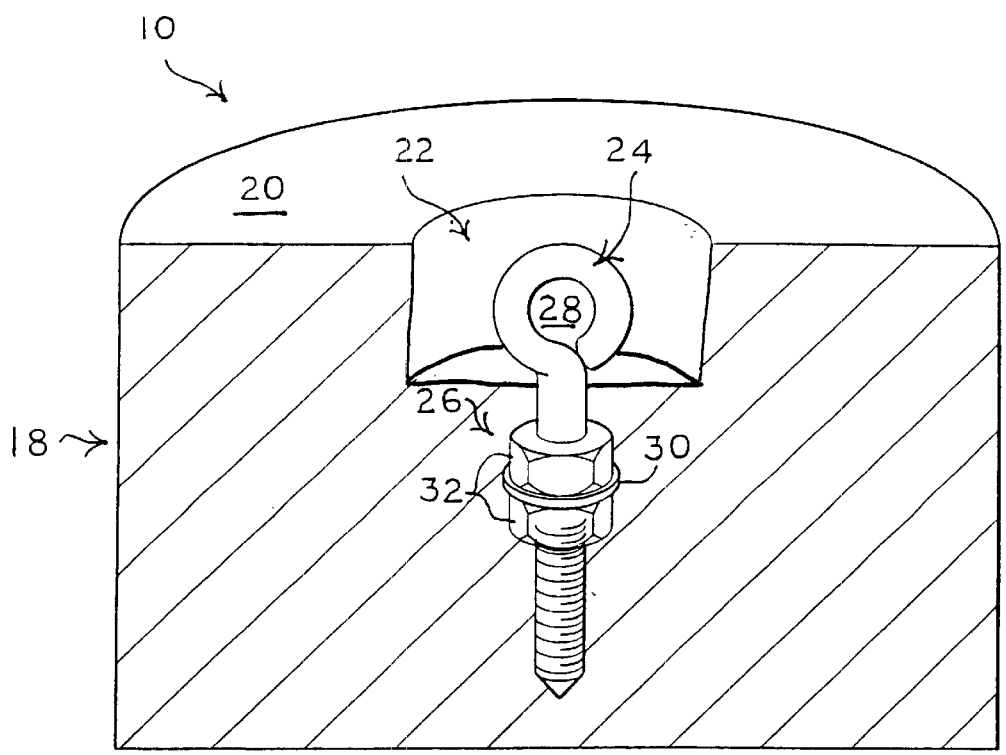
FIG. 3 is a sectional perspective view of the device.

The present invention is directed FIG. 1 to a pet restraint device 10 for embedding in an unfenced lawn 12 to restrict a pet 14 to the length of the leash 16 which can be leather as shown or a chain. A concrete block 18 is embedded in the lawn 12. Although the block 18 is shown having a cylindrical shape in the drawing, it will be understood that the block may be square or rectangular in cross section, the shape not being critical. The top surface 20 of the block 18 has a centered cylindrical recess 22 defined therein. In FIG. 3, an eyebolt 24 is shown having its shank 26 embedded in the concrete with the eye 28 disposed in the cylindrical recess. The shank 26 has a washer 30 disposed thereon between two nuts 32 which can be further separated for better anchoring of the eyebolt 24 in the concrete block 18.

Figure 2:
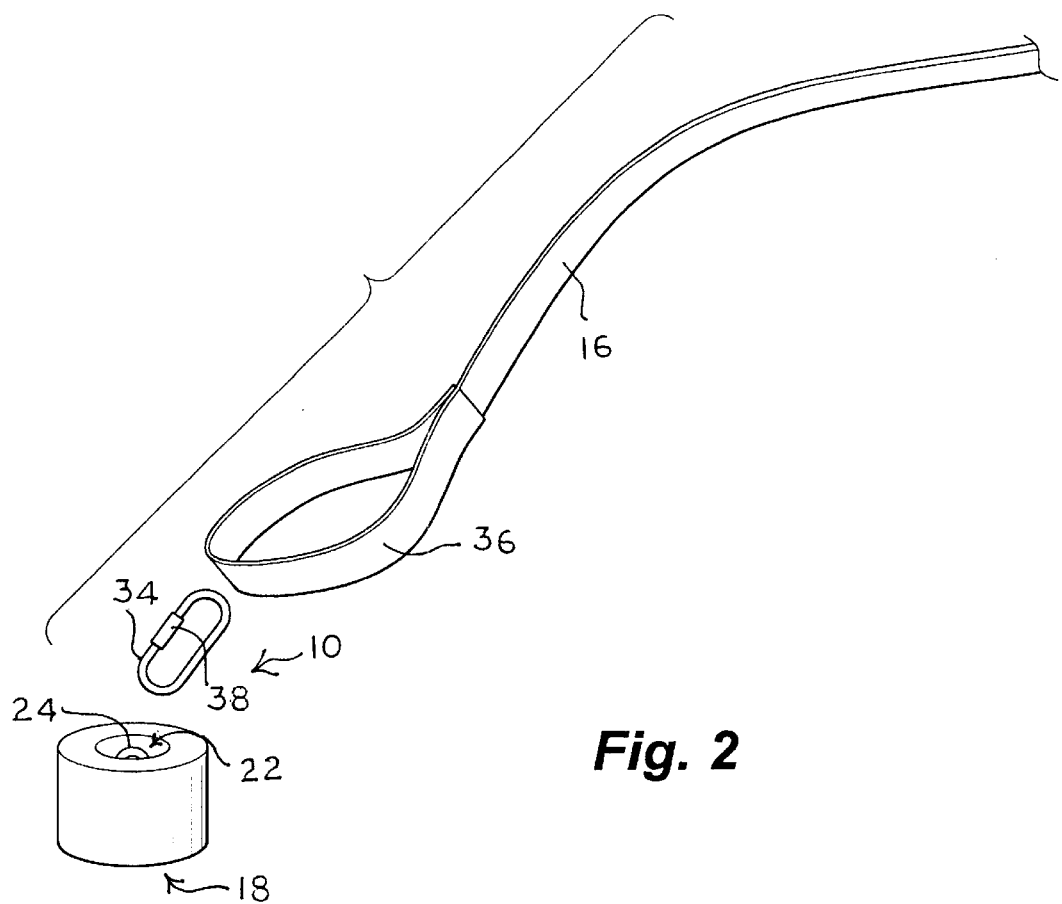
FIG. 2 is an exploded view of the device and a partial leash.

In FIG. 2, an oval spring clamp 34 is shown for providing the connecting means to the hand loop 36 of the leash 16. The clamp 34 has a collar 38 having a spring (hidden) for opening and closing purposes.

A major advantage of this invention is that it can be made readily by any pet owner by utilizing preparing a mold for the concrete and inserting a cylindrical section from a plastic cup, the bottom of the cup being removed, into the mold to define the cylindrical recess 22 and pouring the concrete mix. A stainless steel eyebolt 24 5 inches long and ⅜ inch in diameter has threaded onto the stem a 1.5 inch diameter washer 30 between two hexagonal nuts 32 to provide the anchor element 26. The eyebolt 24 is placed into the mold centered in the cup while the concrete is still moist and the concrete block 18 is allowed to harden.

Other advantages are as follows.

The pet restraint device 10 is durable, rustproof, and may be planted in the lawn 12 in various locations for immediate use.

The pet owner no longer has to worry about leaving the pet restraint device 10 in or forgetting to remove it.

The pet restraint device 10 does not interfere with the cutting of the lawn 12, since the eyebolt 24 is disposed in the recess 22 and the concrete block 18 may be embedded in the lawn with its top surface flush with the ground.

The pet restraint device 10 can restrain any size of pet 14 and multiple pets 14.

It is to be understood that the present invention is not limited to the embodiments described above, but encompasses any and all embodiments within the scope of the following claims.

I claim:

1. A pet restraint device for embedding in a lawn comprising:

a concrete block having a top surface with a cylindrical recess defined therein;

an eyebolt having its shank embedded in said concrete block and its eye disposed in the cylindrical recess; and a washer and two nuts disposed on the shank of said eyebolt for anchoring the eyebolt in said concrete block;

wherein the eye of said eyebolt is adapted for receiving a leash in order to tether a pet animal to said concrete block.

2. The pet restraint device according to claim 1, further comprising a spring clamp for connecting a leash to said eyebolt.

3. A pet restraint device for embedding in a lawn comprising:

a concrete block having a top surface with a cylindrical recess defined by utilizing a plastic cup having its bottom removed embedded in said concrete block; and an eyebolt having its shank embedded in said concrete block and its eye disposed in the cylindrical recess;

wherein the eye of said eyebolt is adapted for receiving a leash in order to tether a pet animal to said concrete block.

4. A method of making at least one pet restraint device comprising:

providing a quantity of wet concrete mix;

providing at least one plastic cup having a bottom;

removing the bottom of the plastic cup to define a cylindrical section;

preparing a form for a concrete block;

inserting the cylindrical section into the form;

pouring the wet concrete mix into the form, keeping the cylindrical section centered and raised to the top surface of the form in order to define a cylindrical recess;

inserting an eyebolt having a washer between two nuts threaded on the shank of the eyebolt vertically into the center of a concave region, keeping the eye of the eyebolt centered in the cylindrical recess; and allowing the concrete mix to harden.

* * * * *